United States Patent
Collins et al.

(10) Patent No.: US 9,129,386 B1
(45) Date of Patent: Sep. 8, 2015

(54) PROCESSING IMAGE DATA ASSOCIATED WITH IT SYSTEM COMPONENTS

(71) Applicant: EMC Corporation, Hopkinton, MA (US)

(72) Inventors: Daniel S. Collins, San Francisco, CA (US); Russell R. Laporte, Webster, MA (US)

(73) Assignee: EMC Corporation, Hopkinton, MA (US)

( * ) Notice: Subject to any disclaimer, the term of this patent is extended or adjusted under 35 U.S.C. 154(b) by 53 days.

(21) Appl. No.: 14/042,703

(22) Filed: Sep. 30, 2013

(51) Int. Cl.
    *G06K 9/48* (2006.01)
    *G06T 7/00* (2006.01)

(52) U.S. Cl.
    CPC .................................... *G06T 7/0085* (2013.01)

(58) Field of Classification Search
    CPC ................... G06K 9/3208; G06T 2207/10008; G06T 2207/20021; G06T 3/40; G06T 7/403
    USPC .......................... 382/199; 358/474, 3.27, 1.15
    See application file for complete search history.

(56) References Cited

U.S. PATENT DOCUMENTS

| 2010/0053690 A1* | 3/2010 | Gotoh et al. .................. 358/3.27 |
| 2013/0242358 A1* | 9/2013 | Kajita et al. .................. 358/474 |

* cited by examiner

*Primary Examiner* — Ruiping Li
(74) *Attorney, Agent, or Firm* — John T. Hurley; Jason A. Reyes; Krishnendu Gupta

(57) ABSTRACT

There is disclosed a technique executed on a mobile computing device for use in analyzing image data. A heatmap is received, wherein the map comprises data representing a single channel image. A plurality of cache levels are built, wherein each cache level comprises a plurality of zones comprising pixel data, wherein each successive cache level comprises a successively lower resolution and corresponding increase in the number of zones. At each cache level, pixel data is analyzed in each zone beginning with the cache level having the lowest resolution and recursively analyzing each successive cache level. The zone is disabled from further analysis if the zone analysis determines the zone to be empty. The zone is marked for further analysis if the zone analysis determines the zone to be full. Edges associated with pixels in the zone are detected. A vector associated with a marker is created, wherein a vector includes positional and magnitude information and the vector is added to a list of vectors.

3 Claims, 8 Drawing Sheets

PROCESSING IMAGE DATA ASSOCIATED WITH IT SYSTEM COMPONENTS

BACKGROUND

1. Technical Field

This application relates generally to processing image data associated with information technology (IT) system components.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Additionally, the need for high performance, high capacity IT systems is driven by several factors. In many industries, critical IT applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable.

It will be appreciated that different tasks may be performed in connection with data storage systems. For example, software may be executed on the data storage systems in connection with performing data storage administration tasks such as for data storage configuration, management, and/or monitoring. The monitoring of data storage systems may include analyzing the health of the data storage system and investigating the cause of a failure in the data storage system when the data storage system fails to function successfully. The monitoring of the data storage system may be performed by services such as a data collection service, a configuration service and a performance analyzer service. For example, the data collection service may gather logs of the storage system ("system logs"), snapshots of the data storage system's memory, configuration and status information of the data storage system. It will be appreciated in case of a failure in such storage systems, it is useful that the information is investigated in a timely manner for preventing further failures in such storage systems.

However, it is also useful that potential problems in connection with data storage systems are identified before a failure or crisis situation arises. If a crisis situation is left to develop it may be too late to rectify the problem in the data storage system without causing disruption and inconvenience to the users of the data storage system.

In many organizations (e.g., companies), it is common to store equipment in racks, which typically house several components on different shelves therein. By storing components in racks, an organization can organize and optimize space utilization. The optimization and organization of space can be very important if the equipment must be stored under particular environmental conditions, such as low humidity and/or low temperature conditions. Under those conditions, a special room is usually dedicated to housing such environmentally sensitive equipment. In any event, it is not uncommon to have a room filled with multiple racks, each storing several components.

Keeping track of the location of each component can be a daunting, but necessary, task. If the organization desires to reconfigure its network, or if a particular component, such as a server, sends out an alert that a hardware component is about to fail, a system administrator must be able to locate the components quickly. System management software is available to help the system administrator monitor computer components such as servers, storage devices, and network routers, and to warn the system administrator if and when intervention is required for a particular component. For example, intervention would be necessary for environmental concerns (such as elevated temperatures in a portion of the equipment), hardware failures, and performance issues. System alerts can also include warnings of potential problems so that the system administrator can take preventive measures to avoid a catastrophic failure.

Typical system management software applications include a system management console program and a system management agent. The console program typically resides on the system administrator's workstation, and the management agent resides on the managed components. The system administrator is able to monitor each component through the cooperation between the console program and the management agent. The utility of such programs can be limited if the system administrator cannot identify the physical location of a component, particularly if the component is one of several hundred, or mounted in a rack that is in a room with dozens of other similar racks.

Systems for creating three-dimensional models of objects such as buildings are known in the art. Such systems allow the user to place features such as floors, ceilings, exterior walls, interior walls, doors, windows, columns or other support structures, and other suitable features in desired locations so as to create a three-dimensional model of a building or other suitable object. In addition, such systems allow a user to create views of the building or other object, such as to view the building or other object from a different perspective, to make a cut-away view through the object, or to otherwise change the view of the model.

Recent developments in integration technology have opened the way for the spread of various portable devices such as mobile phones and tablet computers that provide a variety of functions such as a digital camera function.

SUMMARY OF THE INVENTION

There is disclosed a technique executed on a mobile computing device for use in analyzing image data. A heatmap is received, wherein the map comprises data representing a single channel image. A plurality of cache levels are built, wherein each cache level comprises a plurality of zones comprising pixel data, wherein each successive cache level comprises a successively lower resolution and corresponding increase in the number of zones. At each cache level, pixel data is analyzed in each zone beginning with the cache level having the lowest resolution and recursively analyzing each successive cache level. The zone is disabled from further analysis if the zone analysis determines the zone to be empty. The zone is marked for further analysis if the zone analysis determines the zone to be full. Edges associated with pixels in the zone are detected. A vector associated with a marker is created, wherein a vector includes positional and magnitude information and the vector is added to a list of vectors.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Techniques described herein creates vectors, an approximation of shape size and location, using a pixel map (also referred to as heatmap or simply map) information from processed image data such as a picture captured by a mobile computing device. This technique exploits known characteristics of the input frames to quickly generate sets of vectors using cached copies of pixel heatmaps at various resolutions. These techniques are particularly suitable for images comprising a low signal-to-noise ratio. That is, images that have a small amount of content that's of interest (e.g., white markers) and a large amount of noise or content that is not of interest (e.g., black background). The techniques have been carefully designed to be lightweight, so that they can be used in real-time video captured on a mobile device with limited computational power and are particularly well suited for images that exhibit the following characteristics: the binary image consists of white circles on a black background; the total whitespace is a small percentage of the binary image (i.e., most of the image is composed of black pixels; and the distance between any two white circles ("islands") must be greater than the radius of the larger island.

The techniques use a recursive methodology that allows accurate location of islands to pixel-precision, while working with the smallest sets of data possible. The rough location and size of the islands are found and black background is eliminated from further processing. The scope is then reduced to this rough area, the resolution is increased, and the process is repeated until the exact data is found.

Figure 1:
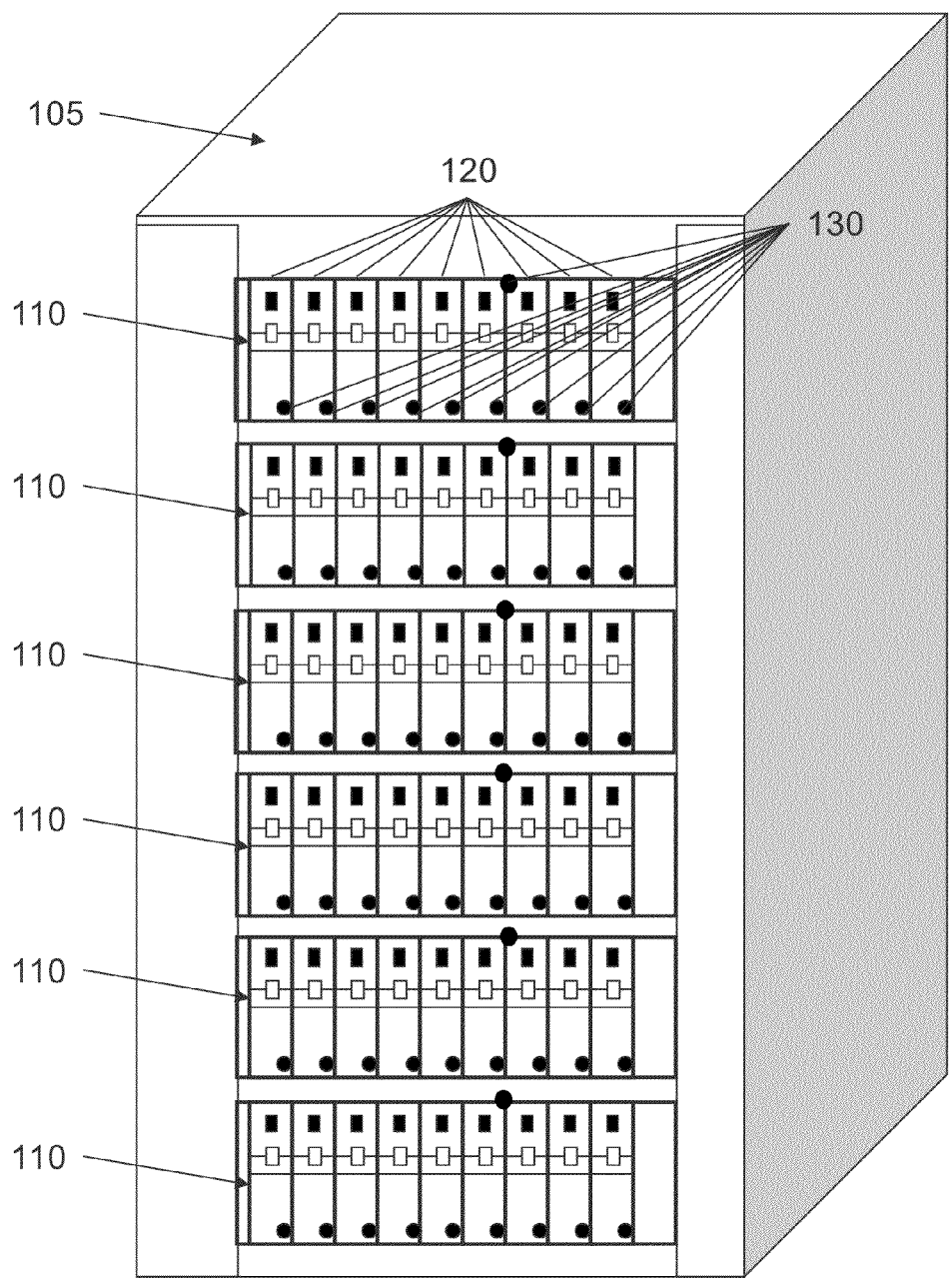
FIG. 1 is an example embodiment of a system that may utilize the techniques described herein.

FIG. 1 illustrates a data storage system comprising components having markers, such as light emitting diodes (LED) that may be used to identify the location of one or more storage system components within the data storage system. As illustrated, rack 105 contains IT components including disk enclosures 110. Disk enclosures 110 contain hard disk and/or solid state drives 120 (collectively disk drives). The disk enclosures 110 and/or disk drives 120 include LEDs 130.

As illustrated in FIG. 1, each of disk enclosures 110 and/or disk drives have one or more LEDs 130 arranged on their face. As discussed above, the arrangement of LEDs 130 can be used to identify the type of IT equipment in an image (e.g., distinguish between disk enclosures 110 and other IT components, such as servers and power supplies, based on the arrangement of the LEDs 130). In some applications, the arrangement of LEDs 130 can be used to determine the position of IT equipment in an image (e.g., determine the position of disk enclosures 110 based on the location and arrangement of LEDs 130 associated with disk enclosure 110).

Figure 2:
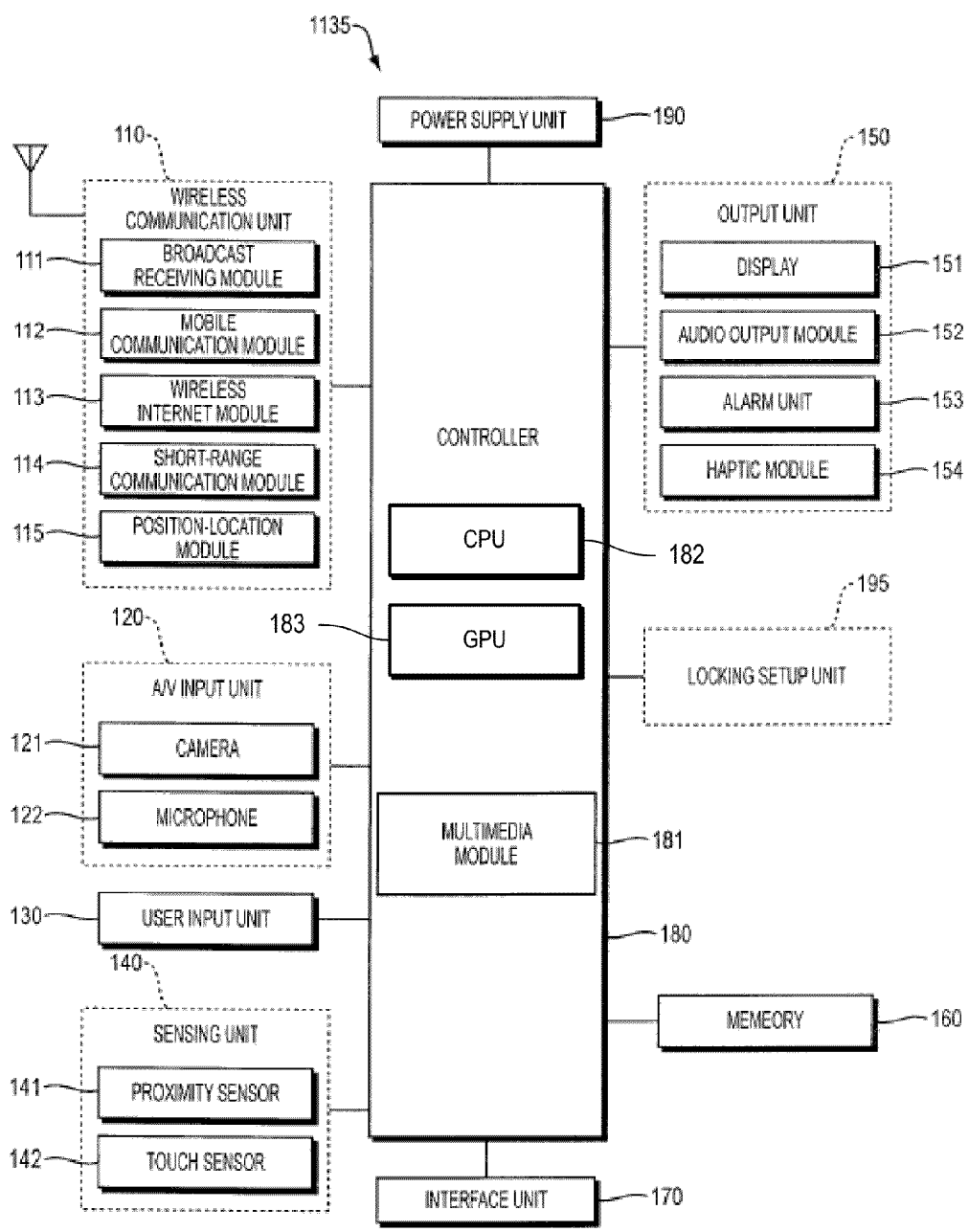
FIG. 2 is a block diagram of an example device that may be used with the technique described herein.

FIG. 2 is a block diagram of device 1135 according to one example embodiment. Other embodiments, arrangements and configurations may also be provided.

As shown in FIG. 2, device 1135 may include a wireless communication unit 110, an A/V (audio/video) input unit 120, a user input unit 130, a sensing unit 140, an output unit 150 having a display 151, a memory 160, an interface unit 170, a controller 180, a power supply unit 190, a locking set-up unit 195 and the like. FIG. 2 shows device 1135 having various components, although all the illustrated components are not a requirement. Greater or fewer components may alternatively be implemented.

Wireless communication unit 110 may include one or more components that permit wireless communication between the device 1135 and a wireless communication system or network within which device 1135 is located. For example, the wireless communication unit 110 may include a broadcast receiving module 111, a mobile communication module 112, a wireless Internet module 113, a short-range communication module 114, a position-location module 115 and/or the like. The broadcast receiving module 111 may receive a broadcast signal and/or broadcast associated information from an external broadcast managing server via a broadcast channel, and the broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.). Such wireless signals may represent audio, video, and data signals according to text/multimedia message transceivings, among others.

The wireless Internet module 113 supports Internet access for the device 1135. This module may be internally or externally coupled to the device 1135. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 may identify or otherwise obtain the location or position of the device 1135. This module may be implemented with a global positioning system (GPS) module.

The audio/video (A/V) input unit 120 may provide audio or video signal inputs to the device 1135. The A/V input unit 120 may include a camera 121 and a microphone 122. The camera 121 may receive and process image frames of still pictures or video that are obtained by an image sensor in a video call mode or a photographing mode. The processed image frames may be displayed on the display 151.

The image frames processed by the camera 121 may be stored in the memory 160 or may be externally transmitted via the wireless communication unit 110. At least two cameras 121 may be provided to the device 1135 based on environment of usage.

The microphone 122 may receive an external audio signal while the device 1135 is in a particular mode, such as phone call mode, a recording mode and/or a voice recognition mode. The audio signal may be processed and converted into electric audio data. The processed audio data may be transformed into a format transmittable to a mobile communication base station via the mobile communication module 112 in case of a call mode. The microphone 122 may include noise removing algorithms (or noise canceling algorithms) to remove or reduce noise generated in the course of receiving the external audio signal.

The user input unit 130 may generate input data responsive to user manipulation of an associated input device or devices. Examples of such devices may include a keypad, a dome switch, a touchpad (e.g., static pressure/capacitance), a jog wheel, a jog switch, etc.

The sensing unit 140 may provide sensing signals for controlling operations of the device 1135 using status measurements of various aspects of the device 1135. For example, the sensing unit 140 may detect an open/close status of the device 1135, relative positioning of components (e.g., a display and a keypad) of the device 1135, a position change of the device 1135 or a component of the device 1135, a presence or an absence of user contact with the device 1135, orientation or acceleration/deceleration of the device 1135. As an example, the device 1135 may be configured as a slide-type mobile terminal. The sensing unit 140 may sense whether a sliding portion of the device 1135 is open or closed. Other examples include the sensing unit 140 sensing presence or absence of power provided by the power supply 190, presence or absence of a coupling or other connection between the interface unit 170 and an external device. The sensing unit 140 may include a proximity sensor 141 and a touch sensor 142.

The output unit 150 may generate outputs relevant to senses of sight, hearing, touch and the like. The output unit 150 may include the display 151, an audio output module 152, an alarm 153 and a haptic module 154.

The display 151 may visually display (i.e., output) information associated with the device 1135. For example, if the device 1135 is operated in a phone call mode, the display 151 may provide a user interface (UI) or a graphical user interface (GUI) that includes information associated with placing, conducting, and/or terminating a phone call. If the device 1135 is in a video call mode or a photographing mode, the display 151 may additionally or alternatively display images that are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The device 1135 may include one or more of such displays.

Some of the displays may be implemented in a transparent or optical transmittive type that can be called a transparent display. A transparent OLED (or TOLED) may be an example of the transparent display. The display 151 may also be implemented as the optical transmittive type. In this configuration, a user may see an object in rear of a terminal body via an area occupied by the display 151 of the terminal body.

At least two displays 151 may be provided on the device 1135 based on the configuration of the device 1135. For example, a plurality of displays may be arranged on a single face of the device 1135 by being spaced apart from each other or by being built in one body. A plurality of displays may be arranged on different faces of the device 1135.

In a case that the display 151 and the touch sensor 141 for detecting a touch action are configured in a mutual layer structure (hereafter called a touch screen), the display 151 may be used as an input device as well as an output device. The touch sensor 142 may be configured as a touch film, a touch sheet, a touchpad and/or the like.

The touch sensor 142 may convert a pressure applied to a specific portion of the display 151 or a variation of a capacitance generated from a specific portion of the display 151 to an electric input signal. The touch sensor 142 may detect a pressure of a touch as well as a touched position or size. A separate pressure sensor may detect pressure of the touch.

If a touch input is provided to the touch sensor 142, signal (s) corresponding to the touch may be transferred to a touch controller. The touch controller may process the signal(s) and then transfer the processed signal(s) to the controller 180. The controller 180 may determine whether a prescribed portion of the display 151 is touched.

The proximity sensor 141 may be provided to an internal area of the device 1135 enclosed by the touch screen and/or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have longer durability than a contact type sensor and may also have a wider utility than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touch screen includes the electrostatic capacity proximity sensor, the proximity of a pointer may be detected using a variation of electric field according to proximity of the pointer. The touch screen (i.e., touch sensor) may be classified as the proximity sensor 141.

In the following description, an action that a pointer approaches without contacting the touch screen may be called a proximity touch. An action that a pointer actually touches the touch screen may be called a contact touch. The meaning of the position on the touch screen proximity-touched by the pointer may define a position of the pointer that vertically opposes the touch screen when the pointer performs the proximity touch.

The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touch screen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output an audio signal relating to a particular function (e.g., a call received, a message received, etc.). The audio output module 152 may be implemented using one or more speakers, buzzers, other audio producing devices, and/or combinations thereof.

The alarm 153 may output a signal for announcing an occurrence of a particular event associated with the device 1135. Events may include a call received event, a message received event and a touch input received event. The alarm 153 may output a signal for announcing the event occurrence by way of vibration as well as video or audio signal. The video or audio signal may be outputted via the display 151 or the audio output unit 152. The display 151 or the audio output module 152 may be regarded as a part of the alarm 153.

The haptic module 154 may generate various tactile effects that can be sensed by a user. Vibration may be a representative one of the tactile effects generated by the haptic module 154. Strength and pattern of the vibration generated by the haptic module 154 may be controllable. For example, different vibrations may be outputted by being combined (or synthesized) together or may be outputted in sequence.

The haptic module 154 may generate various tactile effects as well as vibrations. For example, the haptic module 154 may generate an effect attributed to the arrangement of pins vertically moving against a contact skin surface, an effect attributed to injection/suction power of air through an injection/suction hole, an effect attributed to a skim over a skin surface, an effect attributed to a contact with an electrode, an effect attributed to an electrostatic force, an effect attributed to representation of warm/cold sense using an endothermic or exothermic device and/or the like.

The haptic module 154 may enable a user to sense a tactile effect through a muscle sense of a finger, an arm or the like as well as to transfer the tactile effect through a direct contact. At least two haptic modules 154 may be provided on the device 1135 based on a corresponding configuration type of the device 1135.

The memory 160 may store programs for operating the controller 180. The memory 160 may temporarily store input/output data such as phonebook data, message data, still image, and/or moving image. Data for various patterns of vibration and/or sound outputted in case of a touch input to the touch screen may be stored in the memory 160.

The memory 160 may be implemented using any type or combination of suitable volatile and non-volatile memories or storage devices including a hard disk, a random access memory (RAM), a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.) and/or other similar memory or data storage device. The device 1135 may operate in association with a web storage for performing a storage function of the memory 160 on the Internet.

The interface unit 170 may couple the device 1135 with external devices. The interface unit 170 may receive data from the external devices or may be supplied with power and then transfer the data or power to respective elements of the device 1135 or enable data within the device 1135 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the device 1135 and may include a User Identify Module (UIM), a Subscriber Identify Module (SIM), a Universal Subscriber Identity Module (USIM) and/or the like. A device having an identity module (hereafter called an identity device) may be manufactured as a smart card. The identity device may be connectible to the device 1135 via a relevant port.

When device 1135 is connected to an external cradle, the interface unit 170 may become a passage for supplying the device 1135 with power from the cradle or a passage for delivering various command signals inputted from the cradle by a user to the device 1135. Each of the various command signals inputted from the cradle or the power may operate as a signal enabling the device 1135 to recognize if it is correctly loaded in the cradle.

The controller 180 may control overall operations of the device 1135. For example, the controller 180 may perform control and processing associated with voice calls, data communications, video calls, etc. The controller 180 may include a central processing unit (CPU) 182 and a graphics processing using (GPU) 183 that may be configured as part of the controller 180, or may be implemented as separate components. The controller 180 may include a multimedia module 181 that provides multimedia playback. The multimedia module 181 may be configured as part of the controller 180, or may be implemented as a separate component. The controller 180 may perform a pattern recognizing process for recognizing a writing input or a picture drawing input carried out on the touch screen as characters or images, respectively.

The power supply unit 190 may provide a power required by various components of the device 1135. The power may be internal power, external power, and/or a combination thereof Embodiments may be implemented in a computer-readable medium using, for example, computer software, hardware, and/or some combination thereof. For hardware implementation, embodiments may be implemented using one or more applications of specific integrated circuits (ASICs), digital signal processors (DSPs), digital signal processing devices (DSPDs), programmable logic devices (PLDs), field programmable gate arrays (FPGAs), processors such as CPUs and GPUs, controllers, micro-controllers, microprocessors, other electronic units designed to perform functions described herein, and/or a selective combination thereof. Embodiments may also be implemented by or in conjunction with the controller 180.

For software implementation, embodiments may be implemented with separate software modules, such as procedures and functions, each of which may perform one or more of the functions and operations described herein. The software codes may be implemented with a software application written in any suitable programming language and may be stored in the memory 160, and executed by a controller or a processor, such as the controller 180.

recognizing mode of the display 151 and/or the like may be inputted to the second manipulating unit 132.

Figure 3A:
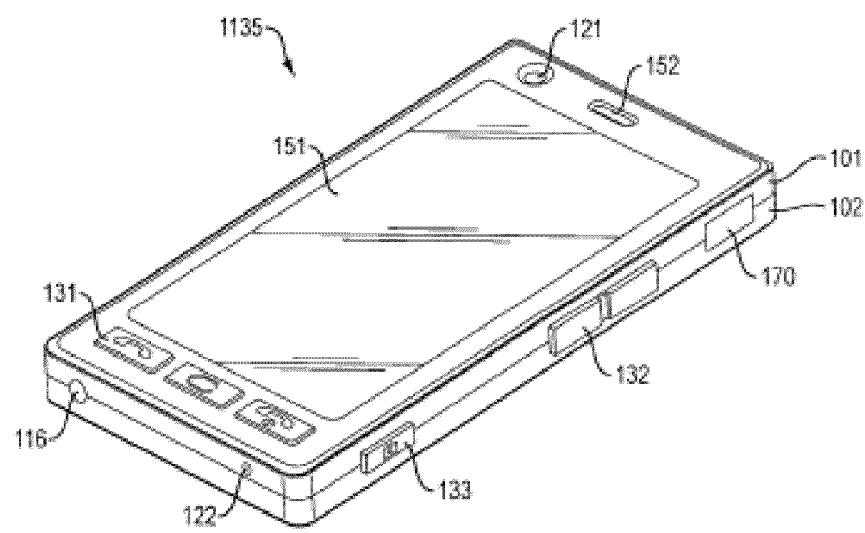
FIG. 3A is a perspective diagram of a front of the example device of FIG. 2.
Figure 3B:
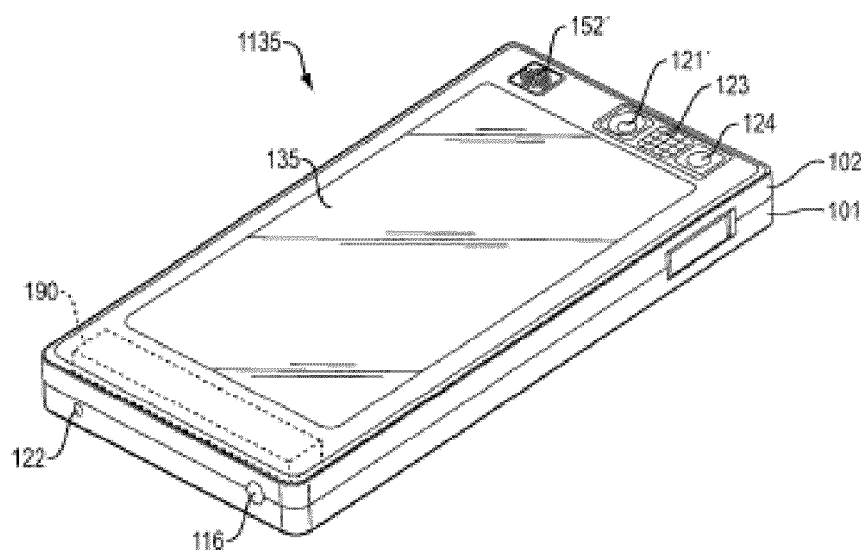
FIG. 3B is a perspective diagram of a backside of the example device of FIG. 2.

FIG. 3B is a perspective diagram of a backside of the device shown in FIG. 3A. Other embodiments, arrangements and configurations may also be provided.

As shown in FIG. 3B, a camera 121' may be additionally provided on a backside of the device body, and more particularly on the rear case 102. The camera 121' may have a photographing direction that is substantially opposite to a photographing direction of the camera 121 and may have pixels differing from pixels of the camera 121.

For example, the camera 121 may have a lower number of pixels to capture and transmit a picture of a user face for a video call, while the camera 121' may have a greater number of pixels for capturing a general subject for photography without transmitting the captured subject. Each of the cameras 121 and 121' may be provided on the device body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (i.e., self-photography) using the camera 121', the mirror 124 may enable the user to view a user face reflected by the mirror 124.

An additional audio output unit 152' may be provided on a backside of the device body. The additional audio output unit 152' may implement a stereo function together with the audio output unit 152 and may be used for implementation of a speakerphone mode in talking over the device 1135.

A broadcast signal receiving antenna 124 may be additionally provided at the lateral side of the device body as well as an antenna for communication or the like. The antenna 124 may be considered as a portion of the broadcast receiving module 111 and/or may be retractably provided on the device body.

The power supply unit 190 for supplying a power to the device 1135 may be provided with respect to the device body. The power supply unit 190 may be built within the device body. Alternatively, the power supply unit 190 may be detachably connected to the device body.

FIG. 3B also shows a touchpad 135 for detecting a touch that is additionally provided on the rear case 102. The touchpad 135 may be configured as a light transmittive type. If the display 151 outputs visual information from both faces, the display 151 may also recognize visual information via the touchpad 135. The information outputted from both of the faces may be controlled by the touchpad 135. Alternatively, a display may be further provided to the touchpad 135 so that a touchscreen may also be provided on the rear case 102.

The touchpad 135 may be activated by interconnecting with the display 151 of the front case 101. The touchpad 135 may be provided in rear of the display 151 and in parallel to one another. The touchpad 135 may have a size equal to or less than a size of the display 151.

Figure 4:
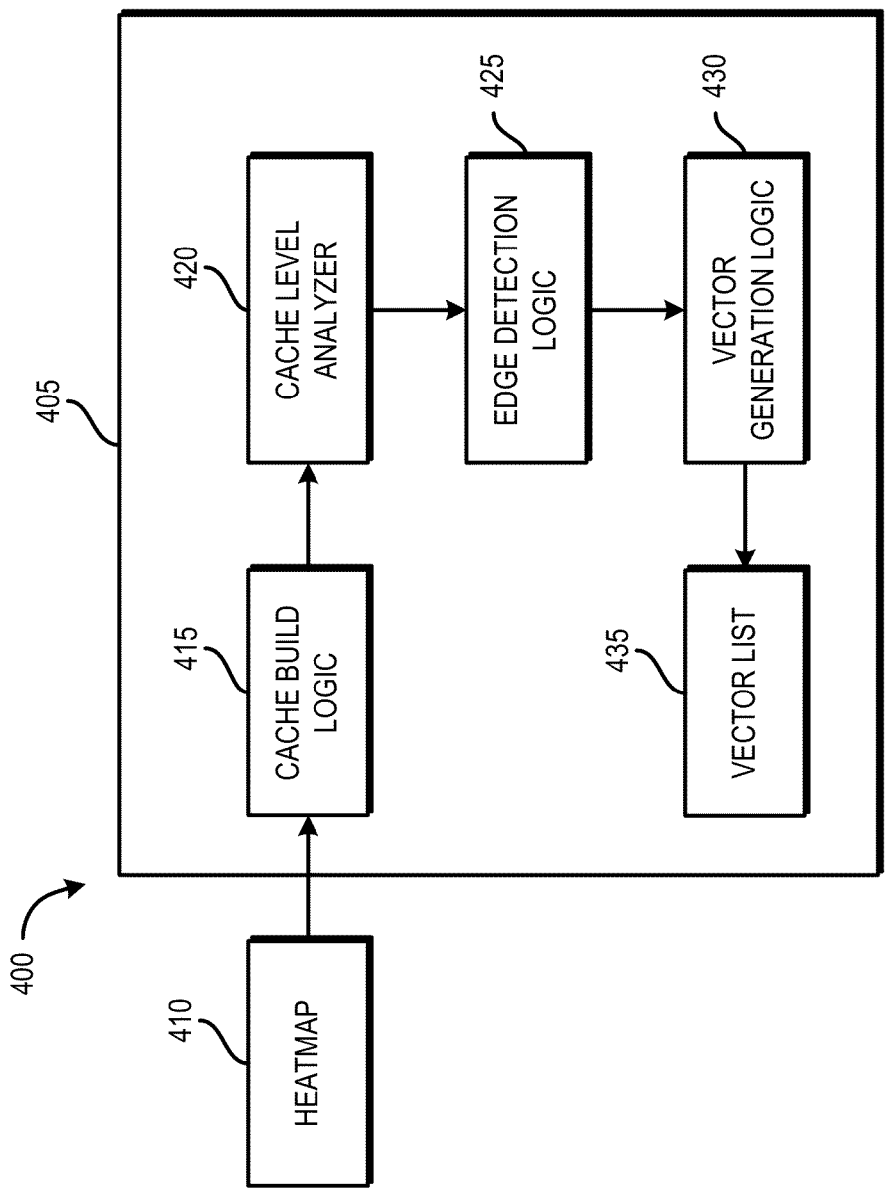
FIG. 4 is a block diagram of an analysis module of a mobile computing device.

FIG. 4 illustrates a system 400 configured to process image data associated with IT components. The system 400 may receive or retrieve a heatmap 410 comprising image data such as that shown in FIG. 5 and discussed below in further detail. The heatmap may be received by a receiver (not shown) or retrieved by a system interface or adapter (not shown). Such a heatmap 410 may represent image data derived from processing an image captured using a mobile computing device camera. The system may include processing components 405 such as cache build logic 415, cache level analyzer 420, edge detection logic 425, vector generation logic 430, and vector list 435.

The cache build logic 415 may be configured to create multiple cache levels wherein each cache level comprises a number of zones that represent successively decreasing resolution levels and increasing zone size. Once all the cache levels are built, the cache level analyzer 420 may start at the top cache level analyzing pixels in each zone to identify markers. In the event a marker lands on the edge of two or more zones, each zone may identify half a marker and depending upon the amount of pixel data measured, the two halves of a marker may be inadvertently discarded. The edge detection logic 425 may be configured to identify markers in such a situation by creating a number of overlapping subzones such that the marker will always be centered in at least one zone. Vector generation logic 430 may be configured to, once a marker is identified, create a vector representing the location and size of the marker.

As used herein, a vector is a complex structure that can be used to represent a marker, such as an LED, where the marker has a particular X-Y location in the heatmap and a particular radius that may be represented according to its bit size. Consequently, an entire image or heatmap's worth of pixels can be represented using a small number of vectors, rather than storing data for every individual pixel. This feature substantially reduces the amount of information used in subsequent processing operations. When employing techniques described herein, post-processed data is typically reduced by a factor of almost 500 as compared with the original image pixel data. The vector information may be forwarded for use in creating a vector list 435 used to store a list of all vectors identified within the heatmap 410.

Figure 5:
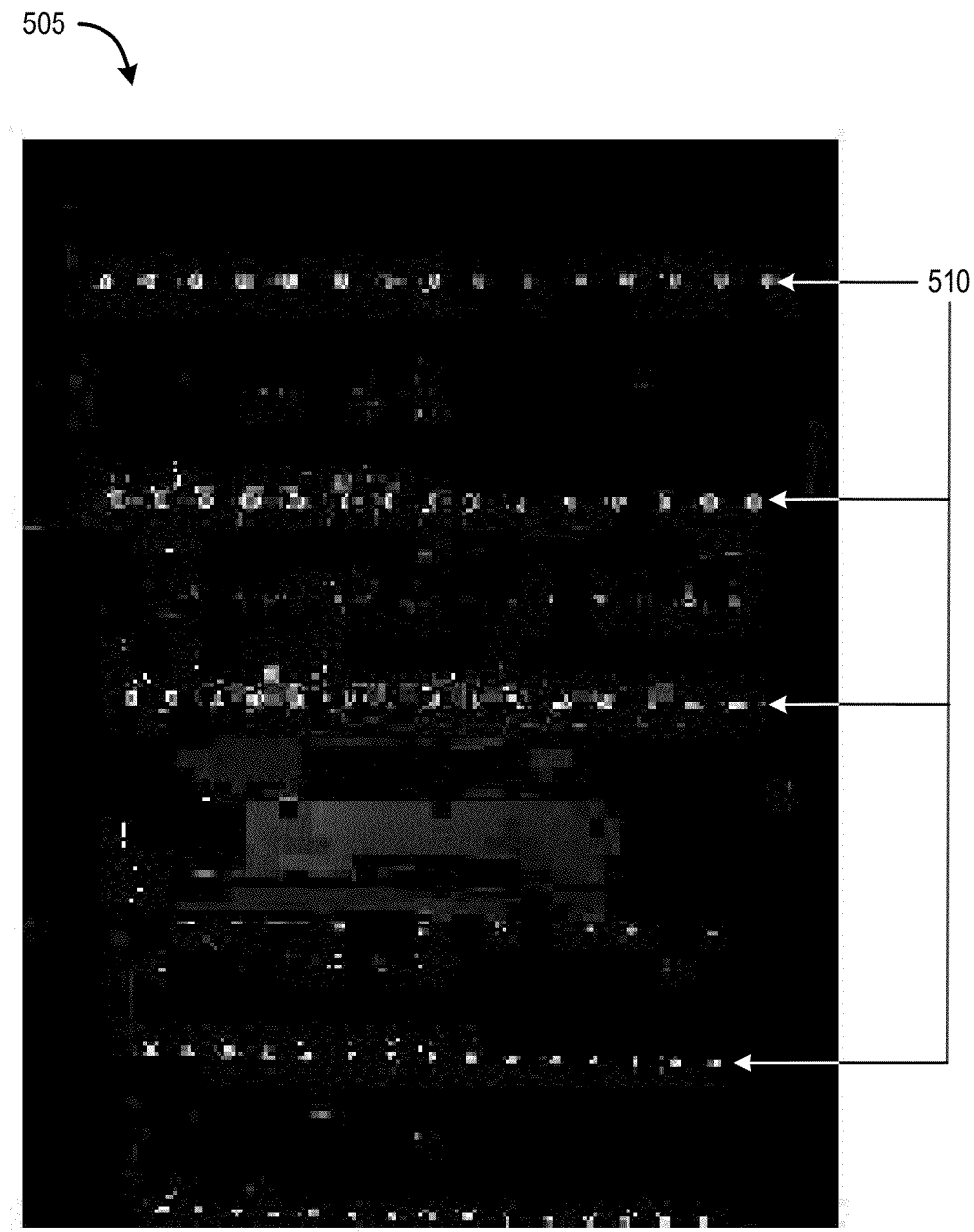
FIG. 5 is a heatmap of a captured image.

FIG. 5 illustrates a heatmap 505 that represents a captured image that has been processed to identify markers displaying a particular color. For example, a mobile computing device may be configured to take a picture of a data storage system comprising IT components, wherein the components may include LEDs. The LEDs may be any number of colors, although in this example the LEDs are green and a band-pass filter may be configured to identify such green LEDs. It should be noted that the band-pass filter may be adjusted such that any color LED may be filtered for identification purposes.

The heatmap 505 illustrates a number of rows of LEDs 510 that possibly represent LEDs of interest. However, depending upon a number of factors, such as the environmental conditions in which the original picture was taken, reflections, angle, distance, and camera quality with which the original image was captured may result in additional image data that needs to be further processed to determine if such data is indeed a marker of interest. Such stray captures data may include green labels, green LEDs from other components not of interest, spurious reflections, and the like. Additional information relating to processing and deriving the heatmap 410, 505 may be found in U.S. patent application Ser. No. 13/799,224, entitled "IDENTIFYING MARKERS ASSOCIATED WITH IT COMPONENTS IN AN IMAGE", filed Mar. 13, 2013, which is incorporated herein by reference for all purposes.

Figure 6:
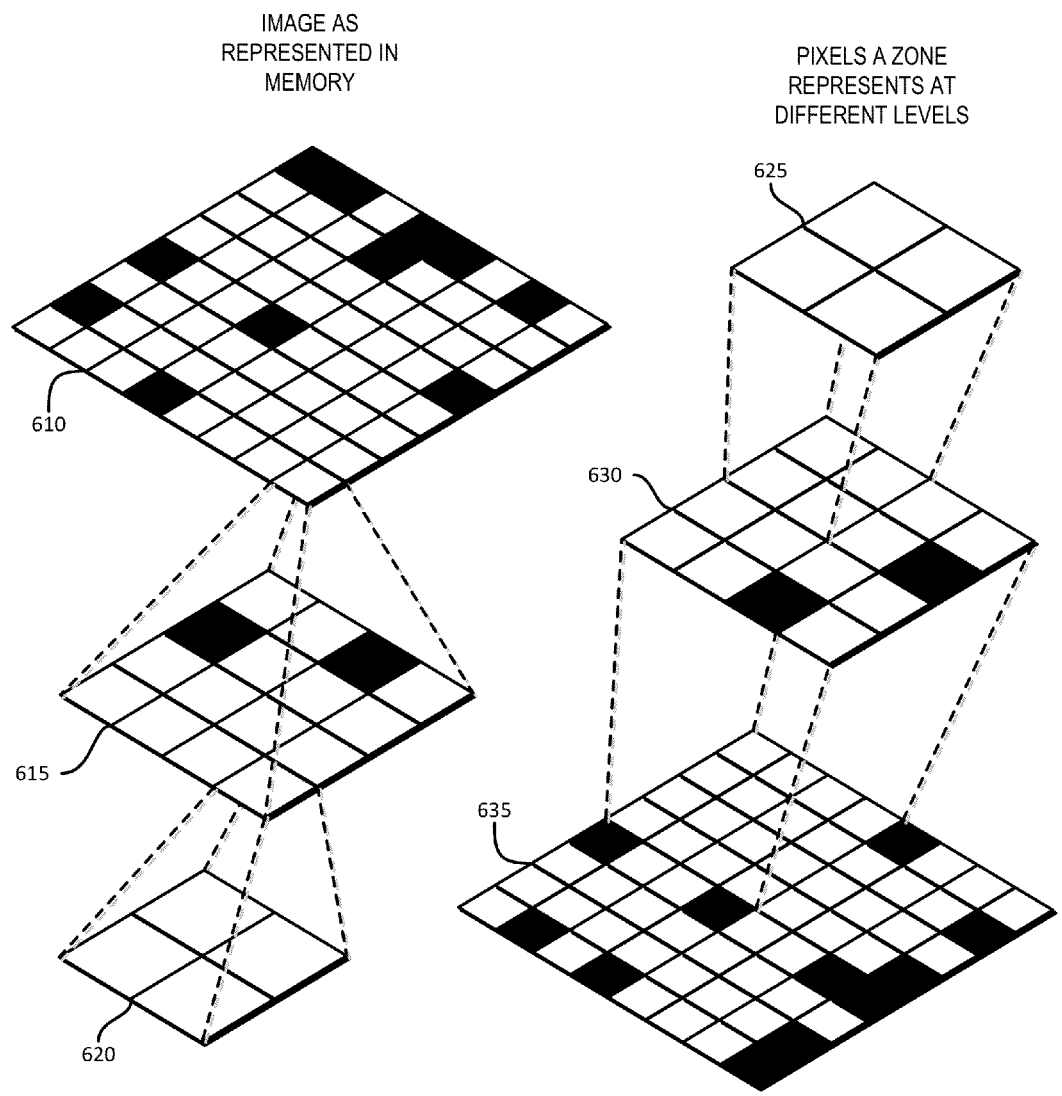
FIG. 6 is an illustration depicting level caches and zones at different resolutions.

FIG. 6 illustrates a method of building cache levels 610, 615, 620 that may be performed by the cache build logic 415 as depicted in FIG. 4. In FIG. 6, a first cache level 620 comprising multiple zones having a particular zone size can be constructed. For example, at the lowest cache level, a zone representing an array of four pixels, two in the X direction to in the Y direction, may be built or constructed for each pixel in the heatmap. A next cache level 615 may be built wherein building the cache level may include constructing a zone size of 16 pixels, four in the X direction and four in the Y direction, for each pixel in the image such that each zone has a lower resolution and larger number of zones than the cache level 620 below it. Once all the zones for this cache level 615 have been constructed, the next cache level 610 may be similarly built. At this level, a zone size of 64 pixels, eight in the X direction and eight in the Y direction, may be similarly constructed and again has a lower resolution and higher number of zones than the cache level below it 615.

This process continues in a similar manner until all cache levels have been built. It should be noted that the construction of each zone in a particular cache level number 610, 615, 620 may advantageously be performed in parallel such that the construction of each cache level may be performed in a relatively quick manner.

The number of cache levels may be configured such that the lowest level zone may include even a single pixel, and at the highest level, the zone may comprise entire image. However, the techniques using the system and method described herein may optimize the highest zone level such that the largest amount of data may be marked as "uninteresting" and discarded from subsequent processing. In other words, a zone size comprising entire image will typically include a marker of interest. Dividing the entire image into quadrants, may, but not necessarily, also include markers of interest that will require subsequent processing. Thus, the highest cache levels need not comprise a zone representing the entire image an will typically be a fraction thereof. FIG. 6 also illustrates how particular zones 625, 630, 635 represent pixels at different levels. In this example, zone 635 is the last cache level created.

Figure 7:
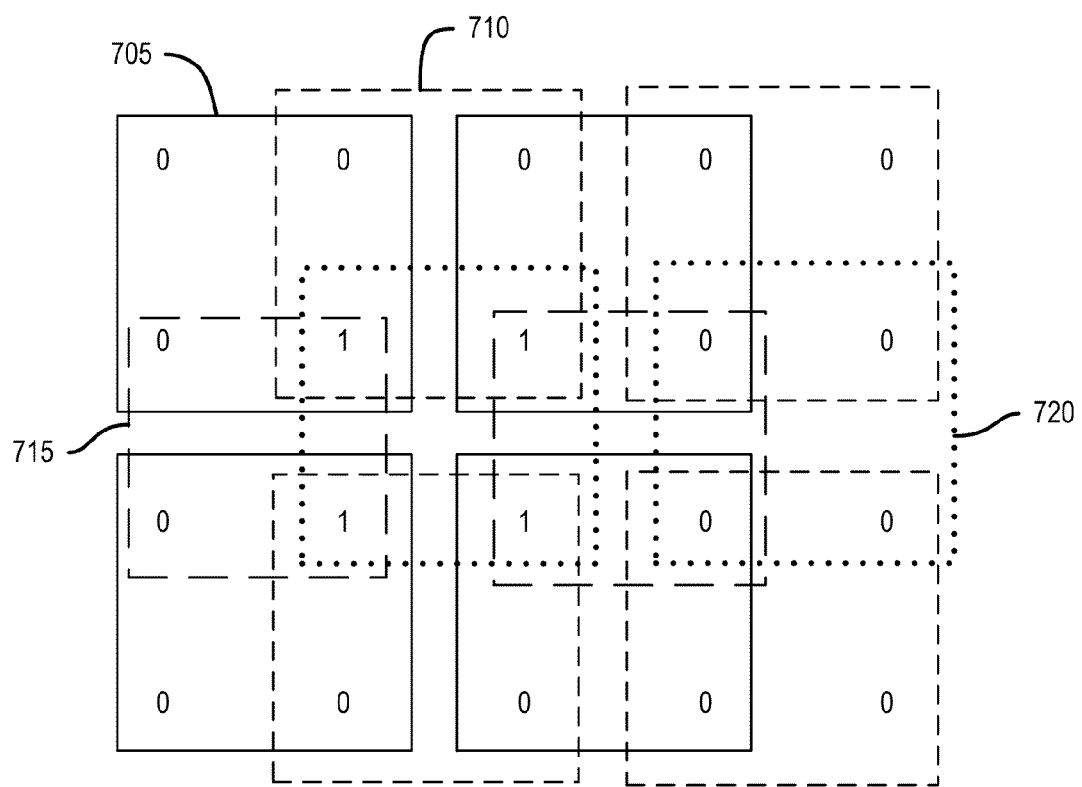
FIG. 7 is an illustrating depicting edge detection grouping.

FIG. 7 illustrates a process representing functionality performed by the edge detection logic 425. In alternative example embodiments, edge detection process may be implemented to further analyze markers that fall on the edge of one or more zones. For example, consider the case where a marker falls on the edge of two zones, half in one zone and half in another zone. Each quadrant will contain a marker with one half its total weight. When analyzing each marker individually, it may not be identified as a potential marker. Thus, additional zones may be constructed such that each zone overlaps another zone.

For example, at a particular cache level, a first set of zones 705 may be constructed using a zone size having an array four pixels. Multiple zones will be built adjacent to each other such that the image is sufficiently represented. In this example, there are four zones 705 wherein two are adjacent to each other in the horizontal direction in two are adjacent to each other in the vertical direction. A second set of zones 710 may be constructed such that zones 710 will overlap zones 705 in the horizontal direction by 50% as shown. A third set of zones 715 may be configured to overlap zone 705 by 50% in the vertical direction. A fourth set of zones 720 may be similarly constructed so as to overlap zone 710 in the vertical and horizontal direction by 50%. It should also be noted that zone 720 will also overlap zone 705 by 25% and zones 710 and 715 overlap each other by 25% as well.

For example, at a first entry cache level (e.g., 2×2 pixel array), the section boundaries are (denoted as N[row|col]):
P[0|0]→P[1|1], P[0|1]→P[1|2], P[0|2]→P[1|3], . . . P[0|N−3]→P[1|N−2], P[0|N−2]→P[1|N−1]
P[1|0]→P[2|1], P[1|1]→P[2|2], P[1|2]→P[2|3], . . . P[1|N−3]→P[2|N−2], P[1|N−2]→P[2|N−1]
P[N−2|0]→P[N−1|1], P[N−2|1]→P[N−1|2], . . . P[N−2|N−3]→P[N−1|N−2], P[N−2|N−2]→P[N−1|N−1]

The next cache level (e.g., 4×4 pixel array) is then calculated from the even elements of the previous level such that:
P[0|0]→P[3|3], P[0|2]→P[3|5], P[0|4]→P[3|7], . . . P[0|N−6]→P[3|N−3], P[0|N−4]→P[3|N−1]
P[2|0]→P[5|3], P[2|2]→P[5|5], P[2|4]→P[5|7], . . . P[2|N−6]→P[5|N−3], P[2|N−4]→P[5|N−1]

The next cache level (e.g., 8×8 pixel array):
P[0|0]→P[7|7], P[0|4]→P[7|11], P[0|8]→P[7|15], . . . P[0|N−12]→P[7|N−5], P[0|N−8]→P[7|11\1-1]
P[4|0]→P[11|7], P[4|4]→P[11|11], P[4|8]→P[11|15], . . . P[4|N−12]→P[11|N−5], P[4|N−8]→P[11|N−1] . . . .

This process can be easily multithreaded within each level calculation; however each level is dependent on the previous. This method may be implemented on a GPU for optimal performance, as hundreds of threads can be run in parallel.

Thus, when employing the techniques described herein, any marker that may fall on the edge of one zone will be completely within another zone. In this way, markers falling on edges will be identified and subsequently processed in an alternative zone to avoid a situation where a marker is inadvertently discarded after being incorrectly identified due to insufficient marker weighing.

Figure 8:
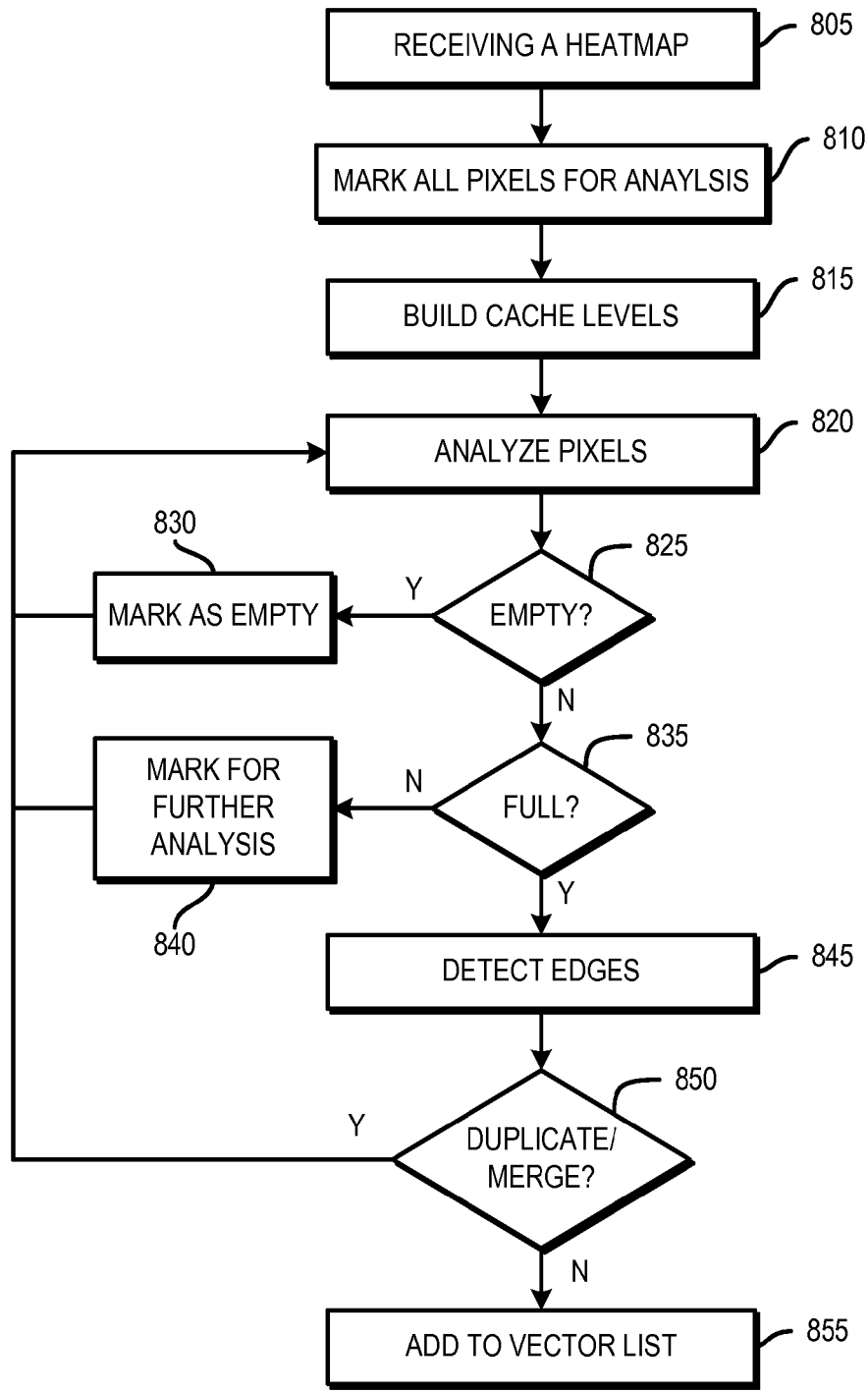
FIG. 8 is a flowchart of a method for processing image data.

FIG. 8 is a flow diagram that illustrates an example method for use in processing image data associated with IT system components, such as disk drives in a data storage system. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin receiving (or retrieving) a heatmap 805. The method can be initiated manually by a user, for example, by clicking on a button or other object in a graphical user interface (GUI) on the mobile computing device or by entering a command in a command-line-interface. Execution of the method can also be based on various user-specified parameters. For example, a user can specify the number of frames per second at which the mobile computing device will capture an image. A user can also specify various settings such as band-pass filter settings for determining a particular marker color.

At step 805, a heatmap may be received (or alternatively retrieved). The heatmap may be a result of a post-processing step whereby a band-pass filter is applied to marker images such that markers having a particular color are represented as a group of white pixels and all other pixels (that is falling outside the band-pass filter) are represented as black pixels.

Thus, the image may contain a small amount of white pixels relative to the background lack pixels. It should be noted that the representation of identified markers as white pixels presented against a black background representing all other pixels is an implementation detail and should not be construed as a limitation. Other combinations such identified markers being represented as black pixels against the white background may be similarly used, among others.

At step 810, the heatmap may be preprocessed by marking all pixels for analysis. That is, during the first pass at the top most cache level, all zones are initially marked for analysis. At step 815, multiple cache levels are built. A first cache level if built starting at the lowest level wherein the first cache level may have the smallest zone size and maximum resolution. Subsequent cache levels are built by increasing zone size (and consequently decreasing resolution) for each successive cache level. It should be noted that a GPU may be implemented for use in building the cache levels such that each set of zones in a particular cache level may be created in parallel. Therefore, even though a particular cache level may comprise many individual zones, the GPU can be configured to simultaneously construct each of the plurality of zones in parallel.

At step 820, pixels are analyzed beginning at the last cache level built. That is, processing begins at the top cache level having the largest zone sizes. In this way, a zone identified as having no marker data (i.e., comprising all black pixels) can be marked or flagged to be removed from subsequent processing steps for each of the zones comprised within that zone for remaining cache level processing. Thus, by identifying large blocks of non-marker data at higher cache levels, a potentially large number of pixels may be removed from subsequent processing, thereby substantially reducing image processing time.

As pixels are analyzed, they may be categorized according to three states: empty, 'not full' (and not empty), and full according to pixel weight for the particular zone. For example, a byte may be used to represent pixel weight of a particular zone, such that a full zone may have a value of 256, and empty zone may have a value of 0, and a not full zone may have a value somewhere between 0 and 256. One or more thresholds may be provided and set to a particular value to provide maximum adjustability and granularity for identifying one or more particular states. For example, a not full zone may be defined as having value greater than 128 or any other desired value (i.e., not substantially empty or full). These thresholds may be configured according to a particular target data storage system, environment, mobile computing device, or other such parameters. Pixel weights may also be scaled such that an empty zone has a value of zero, a full zone has a value of one, and not empty zones falls somewhere between zero and one.

Accordingly, at step 825, if the zone is determined to be empty, the method proceeds to step 830 and the zone is marked as empty and ignored in subsequent processing. The method then proceeds back to step 820 to analyze the next zone's pixels. If the pixels in the zone are not empty, the method proceeds to step 835 where another determination is made to determine if the zone is full. If the zone is not full, additional analysis may be needed to determine if the zone includes a partial marker, such as the edge of a marker or stray artifacts that can be eliminated during subsequent processing. In this case, the method proceeds to step 840 where such zones are marked for further analysis and then proceeds back to step 820 for further pixel analysis operations. However, if at step 835 the zone is determined to be full, it is possible that a marker has been identified. The method then proceeds to step 845, where edge detection process may be performed.

Edge detection is used to determine the radius of the particular marker along with its X and Y coordinates. If the zone is full, then the method checks the weights of neighboring zones. If a neighboring zone has a smaller value, then it is marked as ineligible to save for inspection later. If an adjacent zone is found to have a higher value, then the current zone is ignored instead. If the current zone is the largest value present then it is added to a list of final zones.

The vector may now be trimmed to find the precise size and location. In each of the 4 directions about the filled zone, the bordering sub-zones are checked for pixels. When the furthest zones containing pixels are found, the algorithm steps down and repeats this process until the actual pixel coordinates of the edge of the marker are found. This is done for each full zone as they are found, so that neighboring zones overlapping the found marker can be marked to be ignored before continuing analysis of other not-empty zones in the area.

At step 850 a determination is made to determine if the detected marker is a duplicate or merge event. Each trimmed vector may be run through a grouping algorithm. This compares the vector to each vector already found. The step may be performed to determine if this new vector is in fact a unique object, or if it and another vector are parts of one large object that had a noisy signal from the band-pass filtering used to create the heatmap. This method looks at the radius of the two vectors and compares them to the distance between the two vectors. Parameters set at compile time can affect the strictness of the grouping algorithm. If the parameters are too strict, one marker may end up with multiple vectors; however, if they are too loose then multiple markers may get grouped into one algorithm. The method then returns to step 820 to process the remaining zones in the current cache level.

If the vector is not a duplicate or merge, the analyzed results are used to create vector data associated with the identified marker (i.e., the X and Y coordinates and radius) and the vector is added to the vector list at step 855. The method continues this process for all zones in the current cache level. If all zones in the current cache level have been analyzed, the method proceeds to the next lowest cache level to analyze the set of zones therein in a similar manner until the lowest cache level has been reached. At this point, a vector list of all identified markers is created.

In some situations, the marker, such as an LED, may exhibit characteristics such that the center of the LED is significantly brighter than the edges of the LED. For example, green LEDs when viewed from a particular distance and/or angle may appear white in the center and green along the edges. Consequently, applying a particular band-pass filter to recognize green LEDs may identify the center of the LED as white (therefore, non-green) and as such, when processing the heatmap, the LED will appear as a white ring with a black center. Therefore, even though a complete circle filled the zone, it would not have enough weight to get ranked as full, and as a result, may end up being identified as spurious light and filtered out from the final vector list.

Consequently, alternative example embodiments may include additional processing wherein if a zone is not empty, then its proper weight is further calculated. In this case, a second weight may be calculated that is referred to as the "donut weight." For example, for a donut identified in a given zone, the middle most subsection in the next level down is read, and with that value further solving for the percentage of white pixels that are around the edge of the testing section. The final value for the zone is the greater value from its initial weight and donut weight.

This method may proceed in a similar manner as that described above where if the final weight does not meet the threshold to be considered full then it is added to a collection of zones to be inspected at a lower cache level after the current cache level is complete. Once the top cache level is finished, the algorithm then steps down to the next lower cache level which has twice the resolution. This time, the zones underneath previous zones marked for further analysis (i.e., zones not considered full) are run through this same process. It should be noted that there may be 9 sub-zones underneath every parent zone, with 4 non-overlapping zones, 4 zones overlapping on one axis, and 1 zone in the middle.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method executed on a mobile computing device for analyzing image data, the method comprising:
   receiving a heatmap, wherein the heatmap comprises pixel data associated with pixels representing a single channel image;
   building a plurality of cache levels, wherein the cache levels are cached copies of the heatmap, wherein each cache level comprises a plurality of zones, wherein the zones comprises an array of pixels, wherein each successive cache level comprises a successively lower resolution and corresponding increase in the number of zones;
   analyzing, at each cache level, the pixel data in each zone to identify markers in the pixels beginning with the cache level having the lowest resolution and recursively analyzing each successive cache level;
   disabling the zone from further analysis if the zone analysis determines the zone to be empty;
   marking the zone for further analysis if the zone analysis determines the zone to be full;
   detecting edges associated with at least one pixel in the zone;
   creating a vector associated with an identified marker in at least one zone, wherein a vector includes positional and magnitude information of the identified marker; and
   adding the vector to a list of vectors.

2. The method of claim 1, wherein the heatmap includes pixel data such that a set of pixels identified as a potential marker are displayed as substantially white pixels and other pixels are displayed as substantially black pixels.

3. A system for use in analyzing image data associated with storage systems, the system comprising:
   a computing device configured to receive a heatmap, wherein the heatmap comprises pixel data associated with pixels representing a single channel image;
   cache build logic configured to build a plurality of cache levels, wherein the cache levels are cached copies of the heatmap, wherein each cache level comprises a plurality of zones, wherein the zones comprises an array of pixels, wherein each successive cache level comprises a successively lower resolution and corresponding increase in the number of zones;
   cache level analyzer configured to:

analyze, at each cache level, the pixel data in each zone to identify markers beginning with the cache level having the lowest resolution and recursively analyzing each successive cache level;
disable the zone from further analysis if the zone analysis determines the zone to be empty;
mark the zone for further analysis if the zone analysis determines the zone to be full;
edge detection logic configured to detect edges associated with at least one pixel in the zone;
vector generation logic configured to generate a vector associated with an identified marker wherein a vector includes positional and magnitude information; and
add the vector to a list of vectors.

* * * * *